United States Patent
Rouet et al.

(10) Patent No.: US 9,454,843 B2
(45) Date of Patent: Sep. 27, 2016

(54) MODULATED AND BLENDED ANTI-ALIASING

(71) Applicant: NVIDIA Corporation, Santa Clara, CA (US)

(72) Inventors: Christian Jean Rouet, San Francisco, CA (US); Eric Brian Lum, San Jose, CA (US); Rui Manuel Bastos, Porto Alegre (BR)

(73) Assignee: NVIDIA Corporation, Santa Clara, CA (US)

( * ) Notice: Subject to any disclaimer, the term of this patent is extended or adjusted under 35 U.S.C. 154(b) by 248 days.

(21) Appl. No.: 13/759,959

(22) Filed: Feb. 5, 2013

(65) Prior Publication Data

US 2014/0218390 A1     Aug. 7, 2014

(51) Int. Cl.
| | |
|---|---|
| *G09G 5/00* | (2006.01) |
| *G06T 15/40* | (2011.01) |
| *G06T 15/50* | (2011.01) |
| *G06T 11/40* | (2006.01) |

(52) U.S. Cl.
CPC ............. *G06T 15/405* (2013.01); *G06T 11/40* (2013.01); *G06T 15/503* (2013.01)

(58) Field of Classification Search
CPC ............................... G06T 11/40; G06T 11/001
USPC .......................................................... 345/612
See application file for complete search history.

(56) References Cited

U.S. PATENT DOCUMENTS

| | | | |
|---|---|---|---|
| 6,072,500 A * | 6/2000 | Foran et al. ................... | 345/611 |
| 6,828,983 B1 * | 12/2004 | Vijayakumar et al. ........ | 345/613 |
| 2005/0162441 A1 * | 7/2005 | Dawson ........................ | 345/611 |
| 2011/0267363 A1 * | 11/2011 | Miller et al. .................. | 345/592 |
| 2011/0285747 A1 * | 11/2011 | Kilgard .......................... | 345/613 |

OTHER PUBLICATIONS

Computer Graphics, chapter 14 Open GL: Applicants of the buffers, version 2.00, Jan. 2001. http://www.cs.sun.ac.za/~lvzijl/courses/rw778/grafika/OpenGLtuts/Big/graphicsnotes014.html.*

* cited by examiner

*Primary Examiner* — Devona Faulk
*Assistant Examiner* — Jin Ge
(74) *Attorney, Agent, or Firm* — Zilka-Kotab, PC

(57) ABSTRACT

A system, method, and computer program product are provided for anti-aliasing. During a first processing pass of a plurality of graphics primitives, z data is computed for multiple samples of each pixel in an image to generate a multi-sample z buffer. During a second processing pass of the graphics primitives, computed color values corresponding to each pixel in a color buffer that stores one color value for each pixel are accumulated.

20 Claims, 11 Drawing Sheets

MODULATED AND BLENDED ANTI-ALIASING

FIELD OF THE INVENTION

The present invention relates to anti-aliasing, and more particularly to generating anti-aliased images.

BACKGROUND

Conventional anti-aliasing techniques generate a z value and a color value for each sample within a pixel to produce an anti-aliased image. In general, as the number of samples per pixel increases the quality of the anti-aliased image also increases. The per-sample color values are combined for each pixel of an image to produce anti-aliased color data that is stored in the frame buffer.

The amount of memory needed to store the z and color data to produce the anti-aliased image increases based on the number of samples that are used. For example, when four samples are used for each pixel, the amount of memory needed to store the z and color data is four times the amount of memory needed to store the z and color data when only one sample is used for each pixel. In addition, the amount of bandwidth that is needed to transfer the z and color data between the memory and the graphics processor that computes the per-sample z and color data also increases. Increased memory and bandwidth consumption may result in decreased graphics processing performance and/or increased system cost.

Thus, there is a need for addressing the issues of increased storage and increased memory bandwidth and/or other issues associated with the prior art.

SUMMARY

A system, method, and computer program product are provided for anti-aliasing. During a first processing pass of a plurality of graphics primitives, z data is computed for multiple samples of each pixel in an image to generate a multi-sample z buffer. During a second processing pass of the graphics primitives, computed color values corresponding to each pixel in a color buffer that stores one color value for each pixel are accumulated.

DETAILED DESCRIPTION

When conventional graphics processors are configured to perform anti-aliasing the amount of memory that is allocated to store the color data to produce the anti-aliased image increases based on the number of samples that are used. The color data for each sample is written to the multi-sample color buffer, and then the multi-sample color buffer is read to combine the samples for each pixel to produce the anti-aliased image. Because the samples are written and then read for each pixel, more memory bandwidth is consumed compared with writing a single sample for each pixel to produce an aliased image.

The amount of memory that is allocated to store the color data may be reduced to a single sample for each pixel by using a multi-sample stencil buffer to ensure each sample of a pixel is only shaded once and accumulated into the pixel. The color data for each sample is modulated before being accumulated into a corresponding pixel stored in the color buffer. In addition to decreasing the amount of memory used to store the color data, the memory bandwidth that is consumed is also reduced compared with using a multi-sample color buffer to produce an anti-aliased image.

Figure 1:
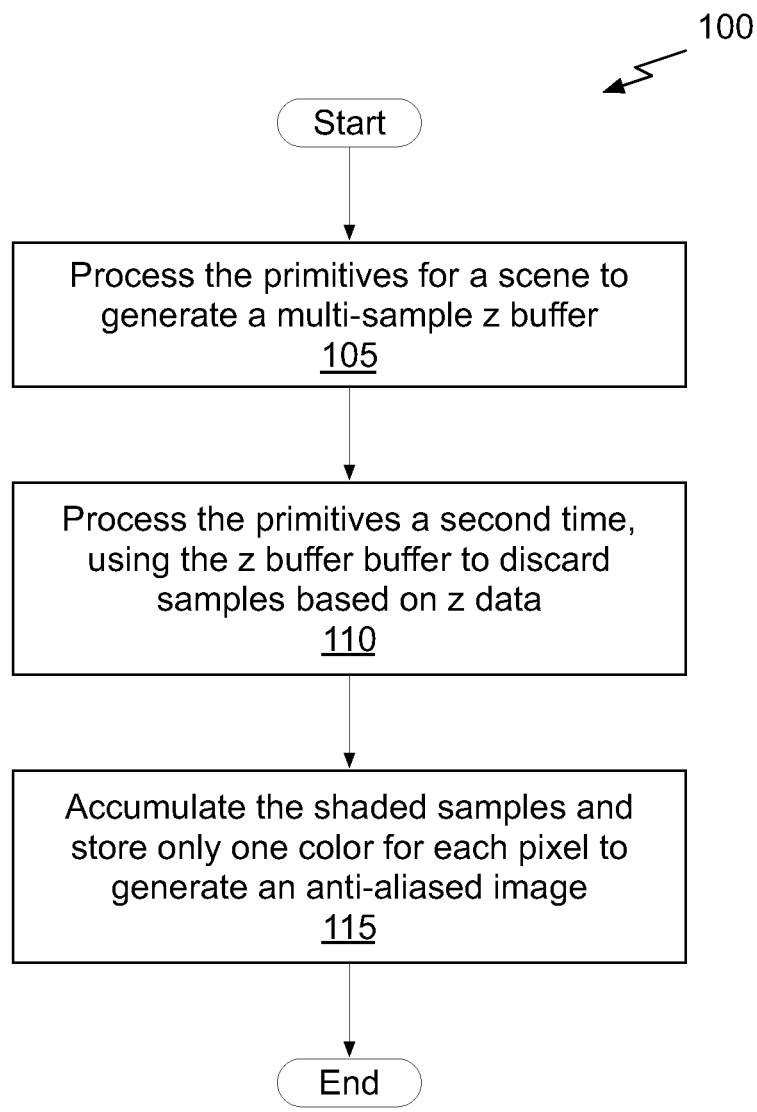
FIG. 1 illustrates a flowchart of a method for generating an anti-aliased image, in accordance with one embodiment.

FIG. 1 illustrates a flowchart of a method 100 for generating an anti-aliased image, in accordance with one embodiment. At step 105, graphics primitives are processed a first time to compute z data for multiple samples of each pixel in an image and generate a multi-sample z buffer. At step 110, the graphics primitives are processed a second time to compute the z data again and discard samples based on the z data. At step 115, the sample color values corresponding to each pixel are accumulated into a color buffer that stores one color value for each pixel. In one embodiment, the sample color values are accumulated into a frame buffer.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2A:
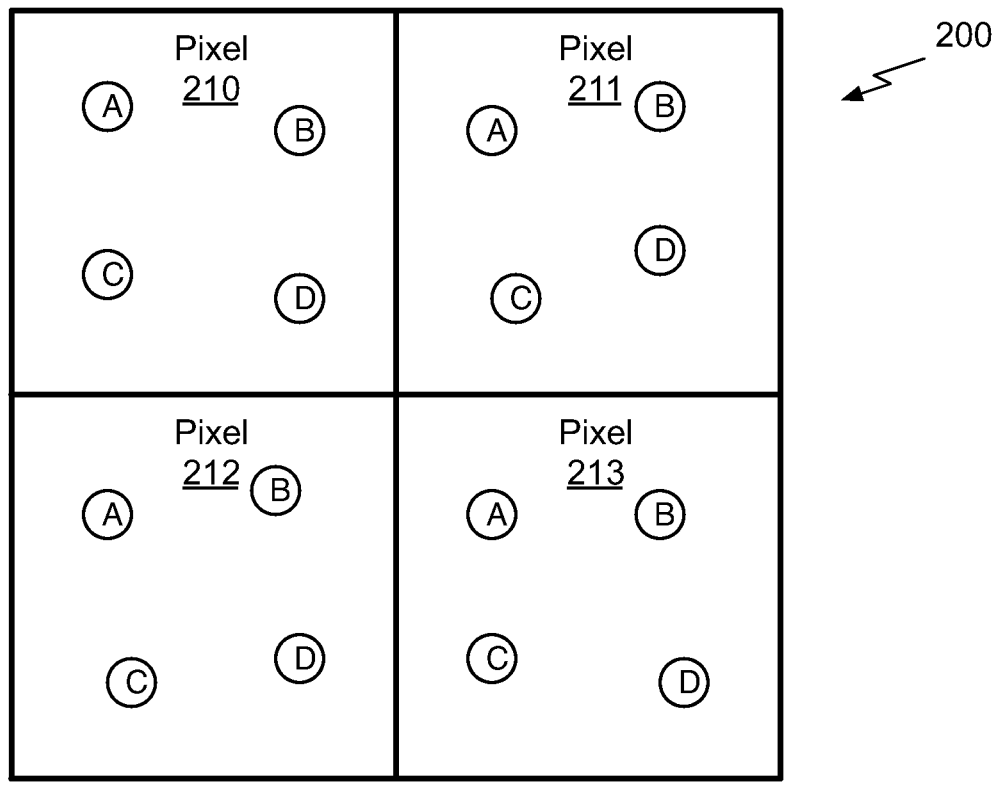
FIG. 2A illustrates a conceptual diagram of sample locations within pixels, in accordance with one embodiment.

FIG. 2A illustrates a conceptual diagram 200 of sample locations within pixels 210, 211, 212, and 213, in accordance with one embodiment. When multi-sampling is used with 4 samples, four separate z values corresponding to locations A, B, C, and D are stored in the multi-sample z buffer for each pixel. As shown in FIG. 2A, the sample locations may be jittered (i.e., distributed) within each pixel to improve the image quality. In one embodiment, a sample location may be positioned at the center of each pixel.

When the stencil buffer is used to generate the anti-aliased image, a multi-sample stencil buffer is allocated to store four separate stencil values corresponding to locations A, B, C, and D. In one embodiment, the multi-sample stencil buffer stores only one bit for each sample. The multi-sample stencil buffer may be used to compute only one color value for each sample, even when two primitives having equal z values cover the sample.

In contrast with the multi-sample z buffer, the color buffer only stores a single value for each pixel. Four separate color values may be computed that each correspond to locations A, B, C, and D and the sample color values are modulated before being accumulated into the single value for a pixel. For example, when four samples are used, each sample color value is scaled by $\frac{1}{4}^{th}$ to modulate the sample color value. In general, each sample color value is divided by the number of samples per pixel to modulate the sample color value. The modulated sample color values for each pixel are accumulated (i.e., summed or added) directly into the color buffer to generate the anti-aliased color value for the pixel. Neither the sample color values nor the modulated sample color values are stored in a multi-sample color buffer. Instead, the accumulated color values are transferred directly to the color buffer as the modulated sample color values are computed.

Figure 2B:
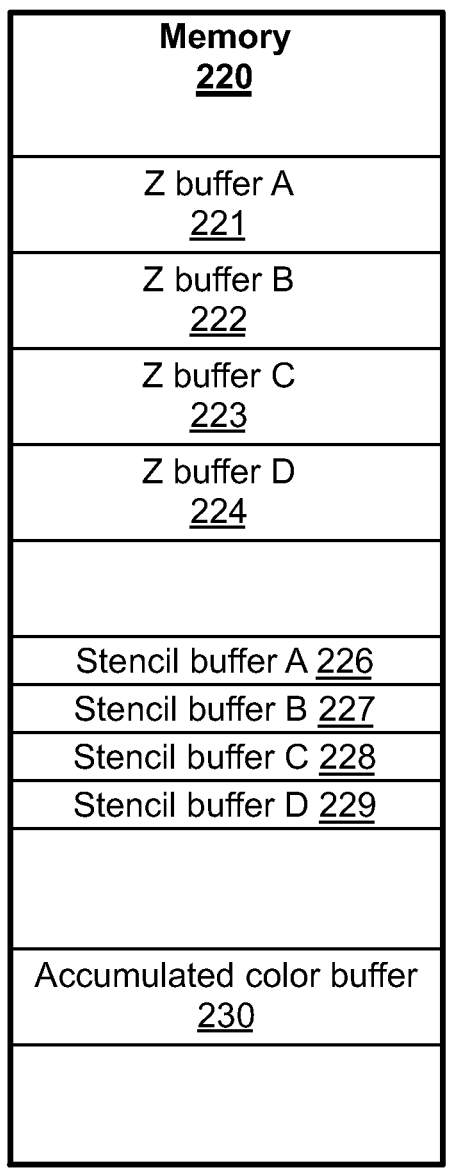
FIG. 2B illustrates a diagram of memory allocations corresponding to a multi-sample Z buffer, a multi-sample stencil buffer, and an accumulated color buffer, in accordance with one embodiment.

FIG. 2B illustrates a diagram of a memory 220 including allocations corresponding to a multi-sample Z buffer, a multi-sample stencil buffer, and an accumulated color buffer 230, in accordance with one embodiment. The multi-sample z buffer may be allocated as single contiguous portion of memory or a separate sample z buffer may be allocated for each of the different locations, e.g., Z buffer A 221, Z buffer B 222, Z buffer C 223, and Z buffer D 224. Similarly, the multi-sample stencil buffer may be allocated as single contiguous portion of memory or a separate sample stencil buffer may be allocated for each of the different locations, e.g., stencil buffer A 226, stencil buffer B 227, stencil buffer C 228, and stencil buffer D 229.

A single accumulated color buffer 230 is allocated to store a single sample for each pixel. The size of the accumulated color buffer 230 does not increase as the number of samples per pixel increases. In contrast, a conventional anti-aliasing technique may require allocation of a single color buffer to store multiple samples for each pixel or separate color buffers for each sample.

Figure 3:
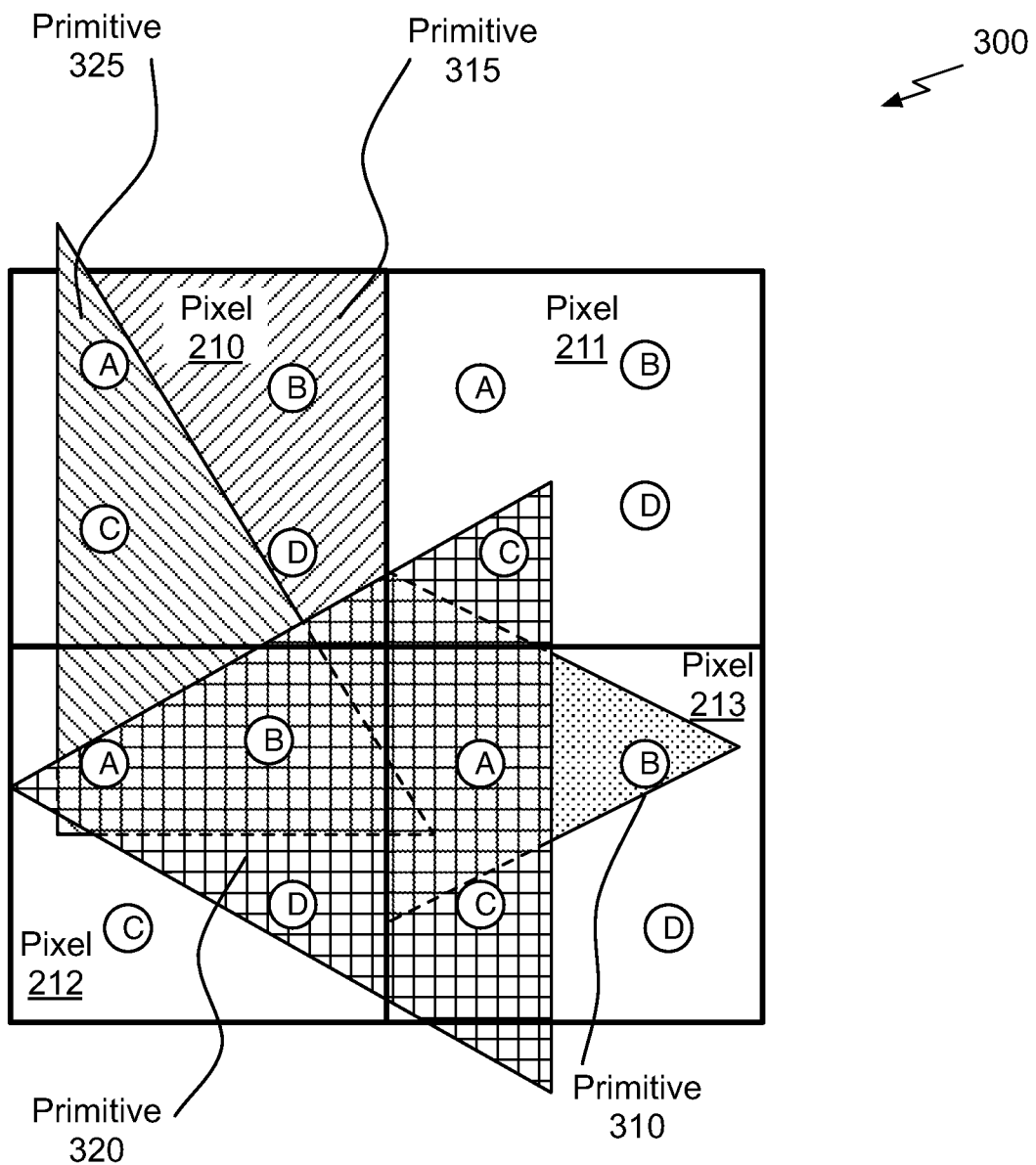
FIG. 3 illustrates another conceptual diagram of graphics primitives intersecting sample locations in pixels, in accordance with one embodiment.

FIG. 3 illustrates another conceptual diagram 300 of graphics primitives 310, 315, 320, and 325 intersecting sample locations in pixels 210, 211, 212, and 213, in accordance with one embodiment. The graphics primitive 320 and the graphics primitive 325 have equal z values. The graphics primitives 310 and 315 are behind the graphics primitives 320 and 325, i.e., have higher z values. When two graphics primitives cover the same sample, the color value for the sample is determined based on the order in which the graphics primitives are processed and the z test function.

In a first example, the z test function is set to "less than" for the first processing of the graphics primitives and the primitive processing order (first to last) is primitive 310, primitive 320, primitive 315, and primitive 325. When the "less than" z test function is used, the z value (computed or stored) that is less than is written (or retained) in the multi-sample z buffer for the sample location. The first processing need only compute z values for each sample location that is covered by a graphics primitive to generate z data that is stored in the multi-sample z buffer.

The first graphics primitive, primitive 310 is rasterized and a z value is computed for each sample location that is covered by the primitive 310. Specifically, z values are computed for sample locations A and B of the pixel 213. The z values are written to the multi-sample z buffer for the sample locations A and B of the pixel 213. The second graphics primitive, primitive 320 is rasterized and a z value is computed for each sample location that is covered by the primitive 320. Specifically, z values are computed for sample locations A, B, and D of the pixel 212, sample locations A and C of the pixel 213, and sample location C of the pixel 211. The computed z values are compared with the z values stored in the multi-sample z buffer for the sample locations that were covered by primitive 310, e.g., sample location A of the pixel 213. Because the primitive 320 is closer than the primitive 310 and the z test function is set to "less than", the computed z value is written to the multi-sample z buffer for the sample location A of the pixel 213, replacing the z value computed for the primitive 310. The other z values computed for the primitive 310 are also written to the multi-sample z buffer.

The third graphics primitive, primitive 315 is rasterized and a z value is computed for each sample location that is covered by the primitive 315. Specifically, z values are computed for sample locations B and D of the pixel 210 and written to the multi-sample z buffer. The fourth (last) graphics primitive, primitive 325 is rasterized and a z value is computed for each sample location that is covered by the primitive 325. Specifically, z values are computed for sample locations A and C of the pixel 210 and sample locations A and B of the pixel 212. The z values computed for the sample locations A and B of the pixel 212 equal the z values that were computed and written to the multi-sample z buffer when the primitive 320 was processed. Therefore, the z values corresponding to primitive 325 fail the z test for the sample locations A and B of the pixel 212. The z values corresponding to the primitive 325 pass the z test for the sample locations A and C of the pixel 210 are written to the multi-sample z buffer.

After the first processing of the graphics primitives, the z test function is set to "equal" for the second processing pass of the graphics primitives. The stencil function is performed after the z test and is set to fail (discard samples) if the stencil value stored in the multi-sample stencil buffer is non-zero. The stencil function is set to pass and then the stencil value is incremented when the stencil value stored in the multi-sample stencil buffer is zero. The result is that when two graphics primitives cover the same sample location and have the equal z values, the first graphics primitive that is processed will be shaded to contribute a color value for the sample location. In one embodiment, the multi-sample stencil buffer may be cleared to an initial value of 1 instead of zero and the stencil function is set to pass and then decrement the stencil value stored in the multi-sample stencil buffer when the stencil value equals 1 and fail if the stencil value stored in the multi-sample stencil buffer equals zero. The multi-sample stencil buffer is used to ensure that only a single graphics primitive contributes a color value for each covered sample location of an image.

For the second processing pass of the graphics primitive the color blend function is set to add color values. For example, in terms of the OpenGL® applications programming interface the blend_func=GL_ADD, blend_src=GL_ONE, blend_dst=GL_ONE. Adding the color values computed for each sample of a pixel accumulates the samples into a single anti-aliased color value for the pixel (dst). However, before each sample color value is summed with the color value for the pixel, the sample color value (src) is modulated based on the number of samples per pixel (i.e., the multi-sample mode).

Continuing with the first example, during the second processing pass of the graphics primitives, the first graphics primitive, primitive 310 is rasterized and a z value is computed for each sample location that is covered by the primitive 310. Specifically, z values are computed for sample locations A and B of the pixel 213. The z value computed for the sample location A fails the z test and the z value computed for the sample location B passes the z test. Because the z data is already stored in the multi-sample z buffer it is not necessary to write any z values to the multi-sample buffer during the second processing pass of the graphics primitives. The sample location A of the pixel 213 for the primitive 310 is discarded and only the sample location B for the pixel 213 continues to be processed for the primitive 310.

The multi-sample stencil buffer value corresponding to the sample location B for the pixel 213 equals zero (the stencil buffer values were initialized to zero), so the sample location B for the pixel 213 passes the stencil test. The sample location B for the pixel 213 stored in the multi-sample stencil buffer is updated, i.e., incremented from a value of zero to 1. Updating the stencil value prevents another graphics primitive that passes the z test from contributing color to the sample location B for the pixel 213. It is important that only one graphics primitive contribute color to each sample so that the anti-aliased color is correct for each pixel and is not oversaturated. A color value is computed for the sample location B of the pixel 213 and the color value is scaled by ¼ to compute the modulated color value. The modulated color value is then summed with the color value stored in the accumulated color buffer for pixel 213. The color value that is stored in the accumulated color buffer for pixel 213 equals the modulated color value because the graphics primitive 310 is the first graphics primitive to shade the pixel 213 (i.e., contribute to the accumulated color of the pixel 213) during the second processing pass.

The second graphics primitive, primitive 320 is rasterized and a z value is computed for each sample location that is covered by the primitive 320. Specifically, z values are computed for sample locations A, B, and D of the pixel 212, sample locations A and C of the pixel 213, and sample location C of the pixel 211. The computed z values are compared with the z values stored in the multi-sample z buffer and all of the computed z values pass the z test. Therefore, the stencil values for the sample locations A, B, and D of the pixel 212, sample locations A and C of the pixel 213, and sample location C of the pixel 211 are read from the multi-sample stencil buffer and all of the sample locations covered by the primitive 320 pass the stencil test. The stencil values for the sample locations A, B, and D of the pixel 212, sample locations A and C of the pixel 213, and sample location C of the pixel 211 are updated. The color values are computed for the sample locations A, B, and D of the pixel 212, sample locations A and C of the pixel 213, and sample location C of the pixel 211. The computed color values are scaled by ¼ to compute the modulated color values.

In one embodiment, a single color value is computed for samples within the same pixel and the computed color values are scaled based on the per-pixel coverage. For example, the computed color value for sample locations A and C of the pixel 213 is scaled by ½ to compute a combined modulated color value because 2 of the 4 sample locations are covered. Similarly, the computed color value for the sample locations A, B, and D of the pixel 212 are scaled by ¾ to compute a combined modulated color value because 3 of the 4 sample locations are covered. In another embodiment, separate color values are computed for each sample within a pixel and the separate color values are summed together and scaled based on the per-pixel covered to compute a combined modulated color value. The combined modulated color value is added to the color value for the pixel stored in the accumulated color buffer. Computing a combined modulated color value may reduce the amount of memory bandwidth that is consumed to write the accumulated color buffer.

Continuing with the first example, during the second processing pass of the graphics primitives, the third graphics primitive, primitive 315 is rasterized and a z value is computed for each sample location that is covered by the primitive 315. Specifically, z values are computed for sample locations B and D of the pixel 210 and written to the multi-sample z buffer. The computed z values pass the z test and the multi-sample stencil buffer is read for the sample locations B and D of the pixel 210. The stencil values equal zero, so the sample locations B and D of the pixel 210 pass the stencil test. The stencil values for the sample locations B and D of the pixel 210 are updated in the multi-sample stencil buffer and color values are computed for the sample locations B and D of the pixel 210. The computed color values are modulated and added to the color value stored in the accumulated color buffer for the pixel 210.

The fourth (last) graphics primitive, primitive 325 is rasterized and a z value is computed for each sample location that is covered by the primitive 325. Specifically, z values are computed for sample locations A and C of the pixel 210 and sample locations A and B of the pixel 212. The z values computed for the sample locations A and B of the pixel 212 equal the z values that were computed and written to the multi-sample z buffer when the primitive 320 was processed. Because the z test is set to "equal" all of the z values computed for the primitive 325 pass the z test. However, all the sample locations A and B of the pixel 212 fail the stencil test for the primitive 325 and are discarded. The sample locations A and C of the pixel 210 pass the stencil test and the stencil values for the sample locations A and C of the pixel 210 are updated. The color values are computed for the sample locations A and C of the pixel 210. The computed color values are modulated and added to the color value stored in the accumulated color buffer for the pixel 210. Each of primitives 315 and 325 contributes half of the anti-aliased color value stored for the pixel 210.

In a second example, the z test function is set to "less than or equal" for the first processing of the graphics primitives and the primitive processing order (first to last) is the same as the first example, i.e., primitive 310, primitive 320, primitive 315, and primitive 325.

The first graphics primitive, primitive 310 is rasterized and a z value is computed for each sample location that is covered by the primitive 310. Specifically, z values are computed for sample locations A and B of the pixel 213. The z values are written to the multi-sample z buffer for the sample locations A and B of the pixel 213. The second graphics primitive, primitive 320 is rasterized and a z value is computed for each sample location that is covered by the primitive 320. Specifically, z values are computed for sample locations A, B, and D of the pixel 212, sample locations A and C of the pixel 213, and sample location C of the pixel 211. The computed z values are compared with the z values stored in the multi-sample z buffer for the sample locations that were covered by primitive 310, e.g., sample location A of the pixel 213. Because the primitive 320 is closer than the primitive 310 and the z test function is set to "less than or equal", the computed z value is written to the multi-sample z buffer for the sample location A of the pixel 213, replacing the z value computed for the primitive 310. The other z values computed for the primitive 310 are also written to the multi-sample z buffer.

The third graphics primitive, primitive 315 is rasterized and a z value is computed for each sample location that is covered by the primitive 315. Specifically, z values are computed for sample locations B and D of the pixel 210 and written to the multi-sample z buffer. The fourth (last) graphics primitive, primitive 325 is rasterized and a z value is computed for each sample location that is covered by the primitive 325. Specifically, z values are computed for sample locations A and C of the pixel 210 and sample locations A and B of the pixel 212. The z values computed for the sample locations A and B of the pixel 212 equal the z values that were computed and written to the multi-sample z buffer when the primitive 320 was processed. Therefore, in contrast with the first example, the z values corresponding to primitive 325 pass the z test for the sample locations A and B of the pixel 212 and are written to the multi-sample z buffer. The z values corresponding to the primitive 325 also pass the z test for the sample locations A and C of the pixel 210 and are written to the multi-sample z buffer.

The z data stored in the multi-sample z buffer is the same when the z test function for the first processing is set to "less than" as when the z test function is set to "less than or equal". Therefore, the same anti-aliased image is produced for the two different z test functions. Furthermore, the "less than or equal" z test function may be used for the second processing pass because only z values that are equal will pass the z test. The first graphics primitive that is processed for a sample location that has a computed z value equal to the corresponding z value stored in the multi-sample z buffer will pass the stencil test and continue to be processed. Therefore, the order in which the primitives are processed for the second processing pass of the graphics primitives should be consistent over multiple frames, to avoid introducing visual artifacts in the anti-aliased images. Although the second pass is described as using a multi-sample stencil buffer to discard additional samples have equal z values, other techniques may be used to discard the additional samples and ensure that only one sample contributes to the anti-aliased color value stored for a pixel.

Figure 4A:
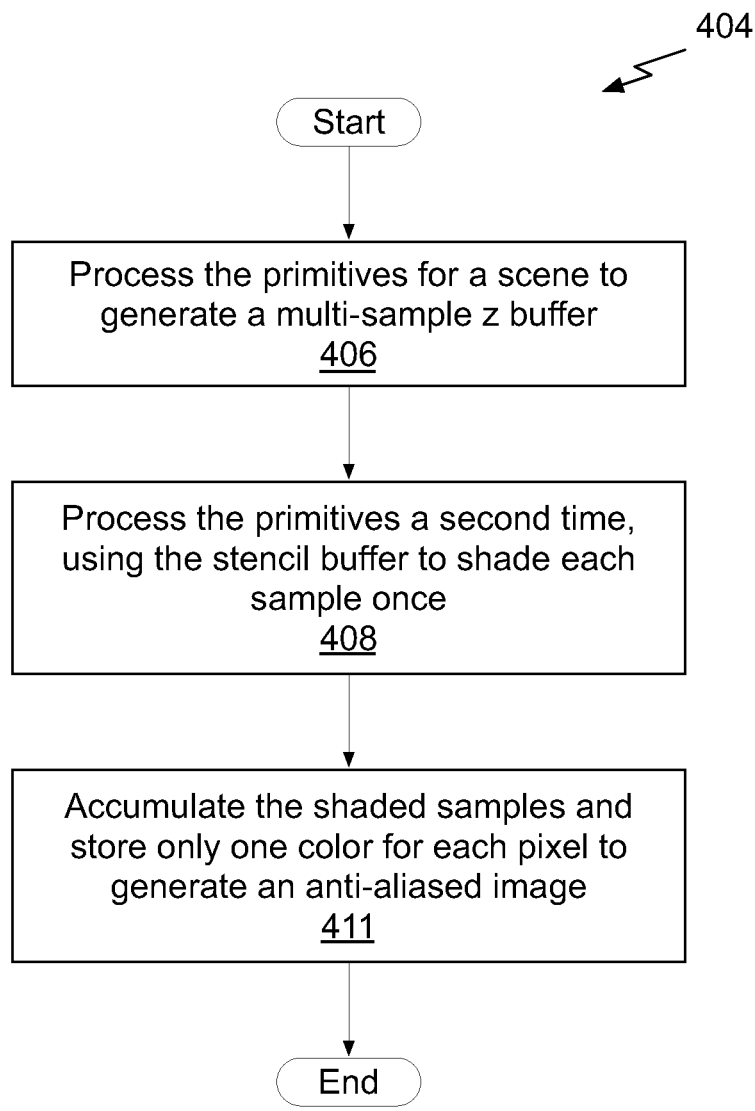
FIG. 4A illustrates another flowchart of a method for generating an anti-aliased image, in accordance with one embodiment.

FIG. 4A illustrates another flowchart a method 404 for generating an anti-aliased image, in accordance with one embodiment. At step 406, graphics primitives are processed a first time to compute z data for multiple samples of each pixel in an image and generate a multi-sample z buffer. At step 408, the graphics primitives are processed a second time to compute the z data again and use a multi-sample stencil buffer to compute only one color value for each sample. At step 411, the sample color values corresponding to each pixel are accumulated into a color buffer that stores one color value for each pixel. In one embodiment, the sample color values are accumulated into a frame buffer.

Figure 4B:
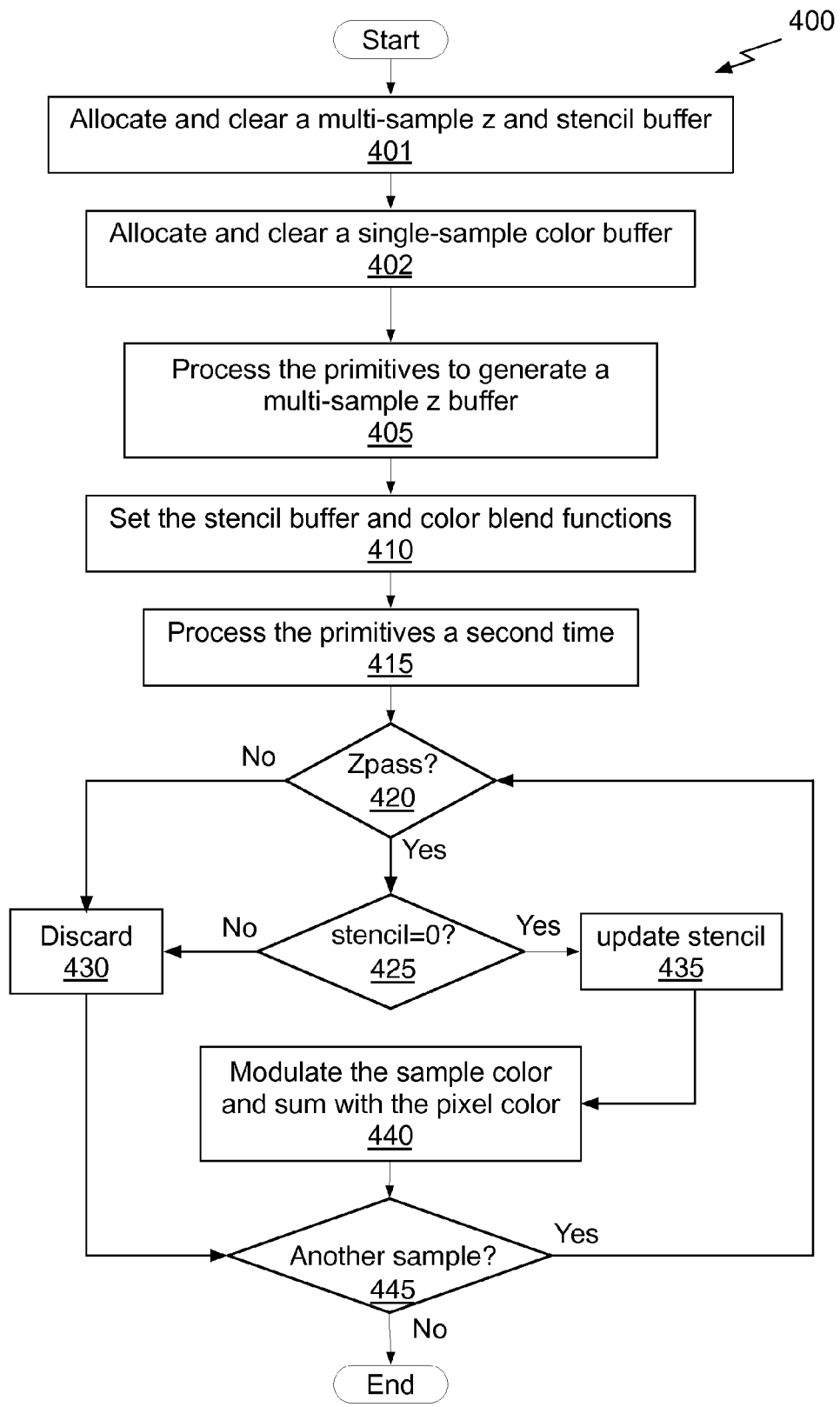
FIG. 4B illustrates another flowchart of a method for generating an anti-aliased image, in accordance with one embodiment.

FIG. 4B illustrates another flowchart of a method 400 for generating an anti-aliased image, in accordance with one embodiment. The steps shown in method 400 may be performed by a shader program that is executed by a graphics processor. At step 401, a multi-sample z buffer and a multi-sample stencil buffer are allocated in memory. The multi-sample z buffer is cleared to a back-most z value (i.e., a maximum z depth). The multi-sample stencil buffer is cleared to an initial value, e.g., zero. At step 402, an accumulated color buffer storing only a single sample per pixel is allocated in memory and cleared to an initial value, e.g., transparent black.

At step 405, graphics primitives are processed a first time to generate z values that are written to the multi-sample z buffer. In one embodiment, a shader program is executed to compute a z value for each sample location that is covered by a graphics primitive. The computed z value is compared with the value stored in the z buffer for the same sample location and the computed z value overwrites the value stored in the z buffer or is discarded based on application of the z test function. The z test function may be set to "less than" or "less than or equal". The purpose of the first processing pass of the graphics primitives is to generate a multi-sample z buffer storing the front-most z values for each sample location of the anti-aliased image. Therefore, only z values need to be computed for each sample location that is covered by a graphics primitive. In other words, it is not necessary to compute color values or other attributes during the first processing pass of the graphics primitives.

At step 410, the stencil buffer function is set and the color blend function is set. The stencil buffer function is set to pass for only one of two or more graphics primitives that cover a sample location when tested against the stencil value stored in the multi-sample stencil buffer for the sample location. For example, the first graphics primitive that is processed for the two or more graphics primitives may pass the stencil test for a particular sample location while one or more other graphics primitives will fail the stencil test for the same sample location. In one embodiment, the stencil buffer function is set to discard a sample having a stencil value that is not equal to zero and update the stencil value for a sample having a stencil value that is equal to zero. The color blend function is set to add a modulated sample color or (a combined modulated sample color) to the color value stored in the accumulated color buffer for the pixel. The stencil function and color blend function may be set prior to the step 405 because the color blend and stencil functions are not used during the first processing pass.

At step 415, the graphics primitives are processed for a second time. At step 420, z testing is performed, and, if the computed z value fails the z test, at step 430, the sample is discarded. Otherwise, at step 425, stencil testing is performed, and, if the stencil value stored in the multi-sample stencil buffer for the sample location is not equal to zero, at step 430, the sample is discarded. Otherwise, at step 435, the stencil value stored in the multi-sample stencil buffer for the sample location is updated, i.e., incremented.

At step 440, the sample color is scaled based on the number of samples to produce a modulated sample color and the modulated sample color is summed with the color value stored in the accumulated color buffer for the pixel. In one embodiment, at step 440, a combined modulated color value is produced for the pixel, and the combined modulated color value is summed with the color value stored for the pixel in the accumulated color buffer. If, at step 445, another sample location is covered by a graphics primitive, the method returns to step 420. Otherwise, the second processing pass of the graphics primitives is complete and the accumulated color buffer stores color values representing the anti-aliased image.

For some applications it is acceptable for multiple samples to contribute to the anti-aliased color stored for a pixel. Additionally, the likelihood of two or more samples having equal z values may be rare. When it is acceptable for multiple samples to contribute to the anti-aliased color for a pixel, the stencil buffer is not needed to perform antialiasing.

Figure 4C:
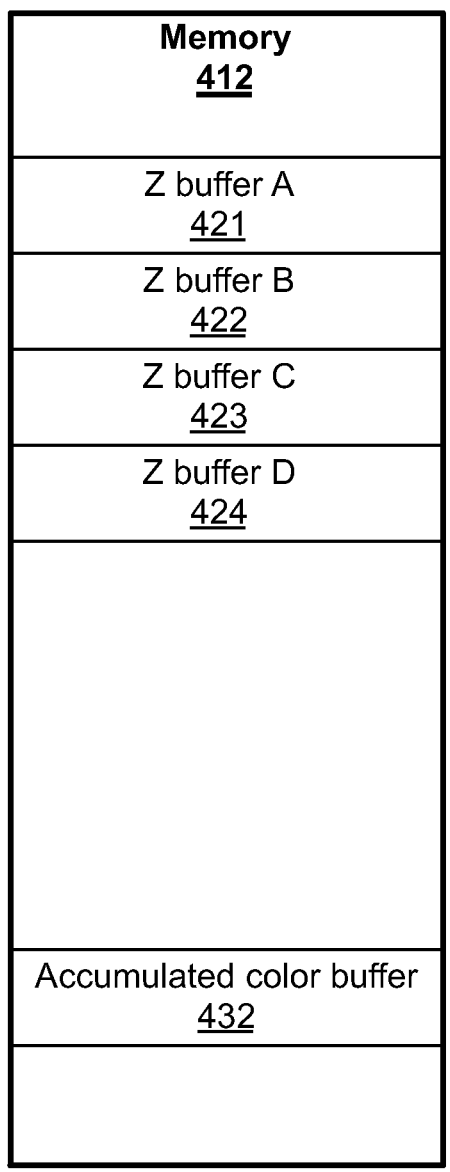
FIG. 4C illustrates a diagram of memory allocations corresponding to a multi-sample Z buffer and an accumulated color buffer, in accordance with one embodiment.

FIG. 4C illustrates a diagram of memory allocations corresponding to a multi-sample Z buffer, and an accumulated color buffer, in accordance with one embodiment. Compared with FIG. 2B memory 412 is not allocated to a multi-sample stencil buffer. The multi-sample z buffer may be allocated as single contiguous portion of memory or a separate sample z buffer may be allocated for each of the different locations, e.g., Z buffer A 421, Z buffer B 422, Z buffer C 423, and Z buffer D 424. A single accumulated color buffer 432 is allocated to store a single sample for each pixel. The size of the accumulated color buffer 432 does not increase as the number of samples per pixel increases. In contrast, a conventional anti-aliasing technique may require allocation of a single color buffer to store multiple samples for each pixel or separate color buffers for each sample.

Figure 4D:
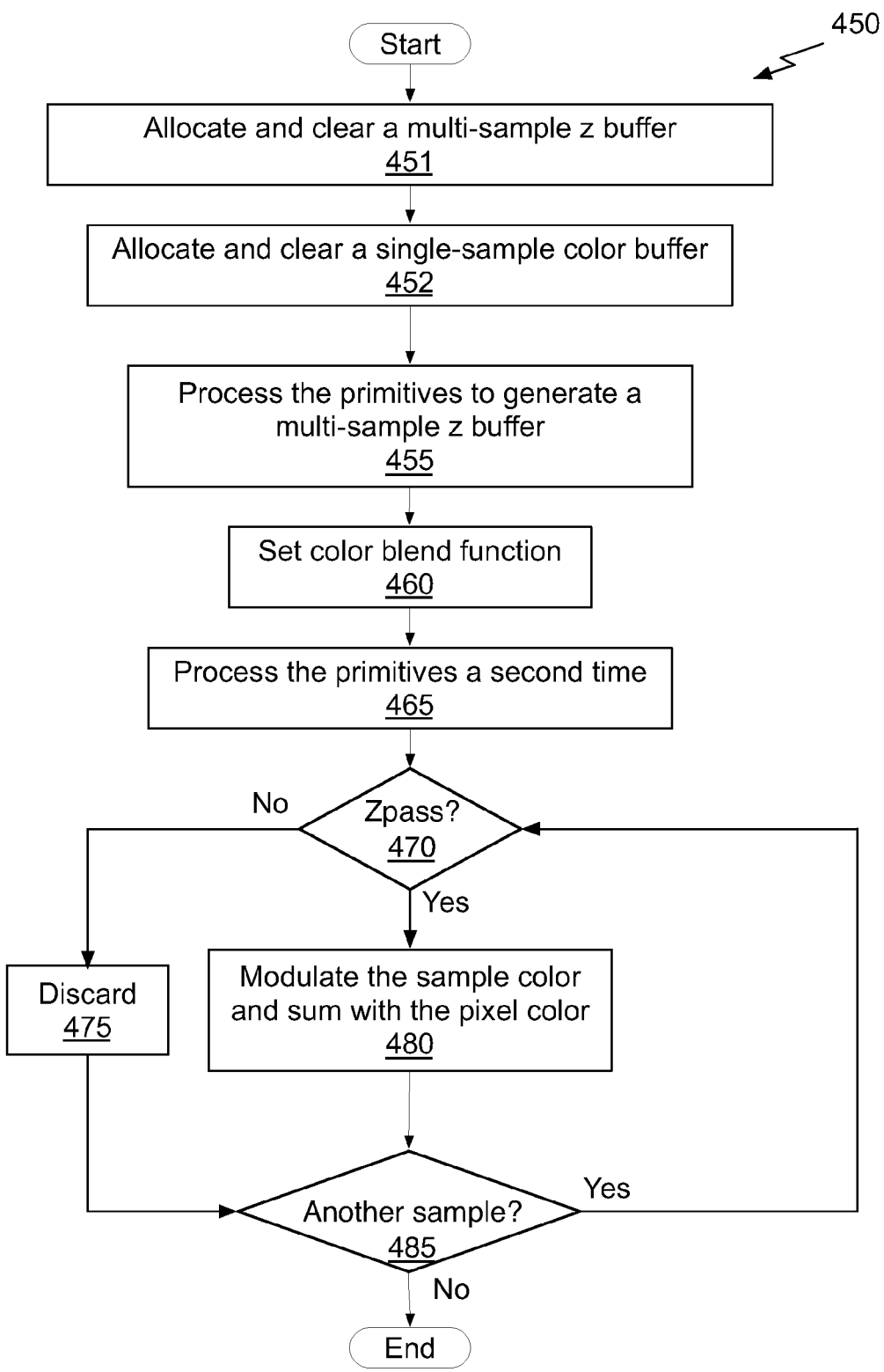
FIG. 4D illustrates another flowchart of a method for generating an anti-aliased image, in accordance with one embodiment.

FIG. 4D illustrates another flowchart of a method for generating an anti-aliased image, in accordance with one embodiment. The steps shown in method 450 may be performed by a shader program that is executed by a graphics processor. At step 451, a multi-sample z buffer is allocated in memory. The multi-sample z buffer is cleared to a back-most z value i.e., a maximum z depth). At step 452, an accumulated color buffer storing only a single sample per pixel is allocated in memory and cleared to an initial value, e.g., transparent black.

At step 455, graphics primitives are processed a first time to generate z values that are written to the multi-sample z buffer. In one embodiment, a shader program is executed to compute a z value for each sample location that is covered by a graphics primitive. The computed z value is compared with the value stored in the z buffer for the same sample location and the computed z value overwrites the value stored in the z buffer or is discarded based on application of the z test function. The z test function may be set to "less than" or "less than or equal". The purpose of the first processing pass of the graphics primitives is to generate a multi-sample z buffer storing the front-most z values for each sample location of the anti-aliased image. Therefore, only z values need to be computed for each sample location that is covered by a graphics primitive. In other words, it is not necessary to compute color values or other attributes during the first processing pass of the graphics primitives.

At step 460, the color blend function is set to add a modulated sample color or (a combined modulated sample color) to the color value stored in the accumulated color buffer for the pixel. The color blend function may be set prior to the step 455 because the color blend function is not used during the first processing pass.

At step 465, the graphics primitives are processed for a second time. At step 470, z testing is performed, and, if the computed z value fails the z test, at step 475, the sample is discarded. Otherwise, at step 480, the sample color is scaled based on the number of samples to produce a modulated sample color and the modulated sample color is summed with the color value stored in the accumulated color buffer for the pixel. In one embodiment, at step 480, a combined modulated color value is produced for the pixel, and the combined modulated color value is summed with the color value stored for the pixel in the accumulated color buffer. If, at step 485, another sample location is covered by a graphics primitive, the method returns to step 470. Otherwise, the second processing pass of the graphics primitives is complete and the accumulated color buffer stores color values representing the anti-aliased image.

Figure 5:
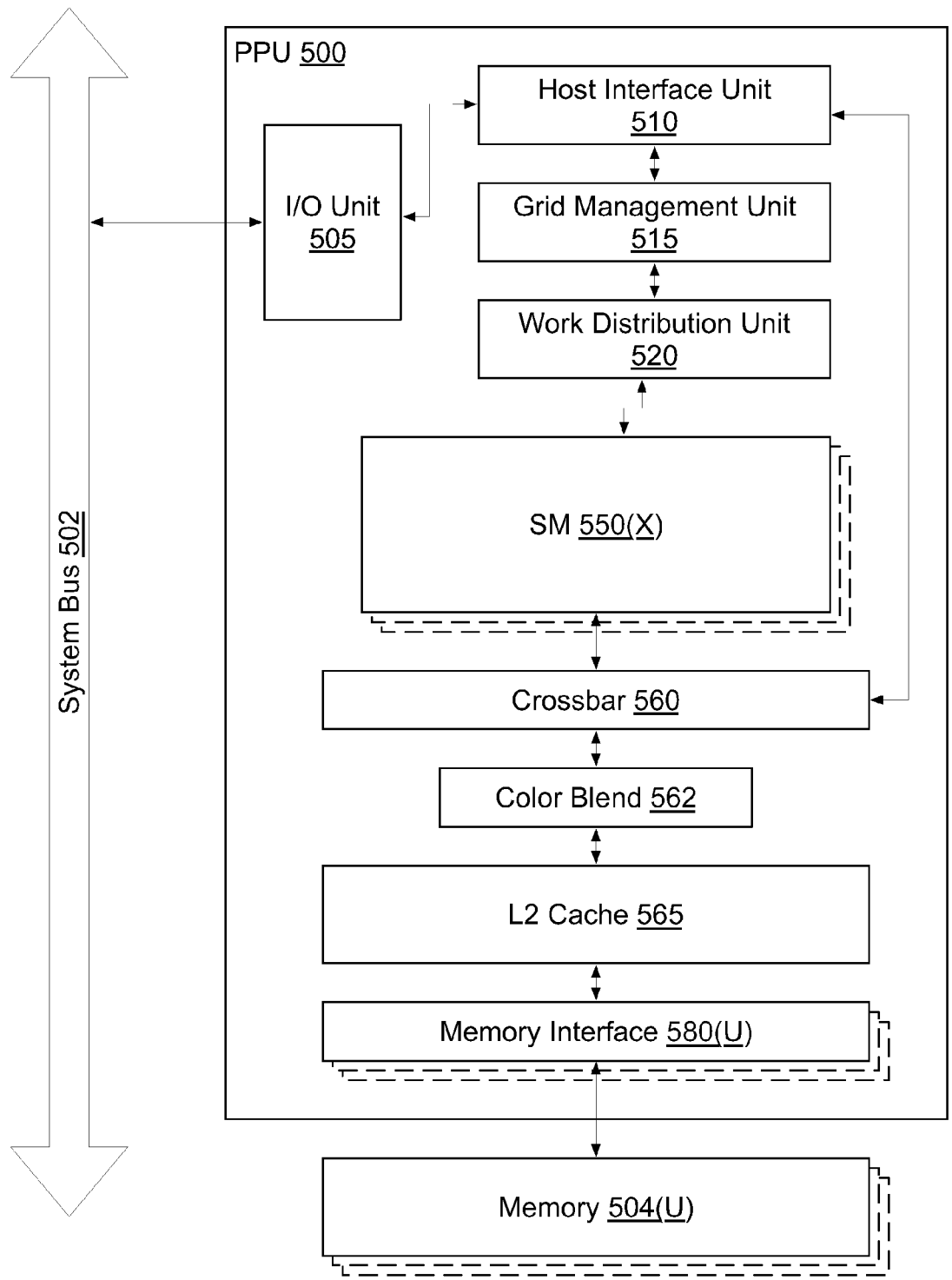
FIG. 5 illustrates a parallel processing unit (PPU), according to one embodiment.

FIG. 5 illustrates a parallel processing unit (PPU) 500, according to one embodiment. While a parallel processor is provided herein as an example of the PPU 500, it should be strongly noted that such processor is set forth for illustrative purposes only, and any processor may be employed to supplement and/or substitute for the same. In one embodiment, the PPU 500 is configured to execute a plurality of threads concurrently in two or more streaming multi-processors (SMs) 550. A thread (i.e., a thread of execution) is an instantiation of a set of instructions executing within a particular SM 50. Each SM 550, described below in more detail in conjunction with FIG. 6, may include, but is not limited to, one or more processing cores, one or more load/store units (LSUs), a level-one (L1) cache, shared memory, and the like.

In one embodiment, the PPU 500 includes an input/output (I/O) unit 505 configured to transmit and receive communications (i.e., commands, data, etc.) from a central processing unit (CPU) (not shown) over the system bus 502. The I/O unit 505 may implement a Peripheral Component interconnect Express (PCIe) interface for communications over a PCIe bus. In alternative embodiments, the I/O unit 505 may implement other types of well-known bus interfaces.

The PPU 500 also includes a host interface unit 510 that decodes the commands and transmits the commands to the grid management unit 515 or other units of the PPU 500 (e.g., memory interface 580) as the commands may specify. The host interface unit 510 is configured to route communications between and among the various logical units of the PPU 500.

In one embodiment, a program encoded as a command stream is written to a buffer by the CPU. The buffer is a region in memory, e.g., memory 504 or system memory, that is accessible (i.e., read/write) by both the CPU and the PPU 500. The CPU writes the command stream to the buffer and then transmits a pointer to the start of the command stream to the PPU 500. The host interface unit 510 provides the grid management unit (GMU) 515 with pointers to one or more streams. The GMU 515 selects one or more streams and is configured to organize the selected streams as a pool of pending grids. The pool of pending grids may include new grids that have not yet been selected for execution and grids that have been partially executed and have been suspended.

A work distribution unit 520 that is coupled between the GMU 515 and the SW 550 manages a pool of active grids, selecting and dispatching active grids for execution by the SMs 550. Pending grids are transferred to the active grid pool by the GMU 515 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 520. In addition to receiving grids from the host interface unit 510 and the work distribution unit 520, the GMU 510 also receives grids that are dynamically generated by the SMs 550 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 500. An application may include instructions (i.e., API calls) that cause the driver kernel to generate one or more grids for execution. In one embodiment, the PPU 500 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 500 comprises X SMs 550(X). For example, the PPU 100 may include 15 distinct SMs 550. Each SM 550 is multi-threaded and configured to execute a plurality of threads (e.g., 32 threads) from a particular thread block concurrently. Each of the SMs 550 is connected to a level-two (L2) cache 565 via a crossbar 560 (or other type of interconnect network). A color blend unit 562 is configured to perform blend functions, such as the blend function used to accumulate the modulated sample color values and combined modulated sample values into the color buffer that may be stored in the memory 540 and cached in the L2 cache 565. The color blend unit 562 may also be configured to modulate the sample color values for each pixel by setting the alpha value (srcAlpha) to the number of samples per pixel to generate a modulated sample color value or setting the alpha value to the per-pixel coverage to generate a combined modulated sample color value. For example, in terms of the OpenGL® applications programming interface the blend_func=GL_ADD, blend_src=GL_ALPHA, blend_dst=GL_ONE. The sample color value (src) is scaled by the alpha value and summed with the color value that is stored for the pixel (dst).

The L2 cache 565 is connected to one or more memory interfaces 580. Memory interfaces 580 implement 16, 32, 64, 128-bit data buses, or the like, for high-speed data transfer. In one embodiment, the PPU 500 comprises U memory interfaces 580(U), where each memory interface 580(U) is connected to a corresponding memory device 504(U). For example, PPU 500 may be connected to up to 6 memory devices 504, such as graphics double-data-rate, version 5, synchronous dynamic random access memory (GDDR5 SDRAM).

In one embodiment, the PPU 500 implements a multi-level memory hierarchy. The memory 504 is located off-chip in SDRAM coupled to the PPU 500. Data from the memory 504 may be fetched and stored in the L2 cache 565, which is located on-chip and is shared between the various SMs 550. In one embodiment, each of the SMs 550 also implements an L1 cache. The L1 cache is private memory that is dedicated to a particular SM 550. Each of the L1 caches is coupled to the shared L2 cache 565. Data from the L2 cache 565 may be fetched and stored in each of the L1 caches for processing in the functional units of the SMs 550.

In one embodiment, the PPU 500 comprises a graphics processing unit (GPU). The PPD 500 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system as well as attributes associated with each vertex of the primitive. The PPU 500 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc.

For example, the GMU 515 may configure one or more SMs 550 to execute a vertex shade/program that processes a number of vertices defined by the model data. In one embodiment, the EMU 515 may configure different SMs 550 to execute different shader programs concurrently. For example, a first subset of SMs 550 may be configured to execute a vertex shader program while a second subset of SMs 550 may be configured to execute a pixel shader program. The first subset of SMs 550 processes vertex data to produce processed vertex data and writes the processed vertex data to the L2 cache 565 and/or the memory 504. After the processed vertex data is rasterized (i.e., transformed from three-dimensional data into two-dimensional data in screen space) to produce fragment data, the second subset of SMs 550 executes a pixel shader to produce processed fragment data, which is then blended with other processed fragment data and written to the frame buffer in memory 504. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

A pixel shader program may be configured to generate anti-aliased images according to the techniques described in conjunction with FIGS. 1-4 when executed by one or more SMs 550. The multi-sample z buffer, multi-sample stencil buffer and accumulated color buffer may be stored in the memory 504. In addition to reducing the amount of memory allocated for storing color data, when the two pass technique is used to generate the anti-aliased image, the bandwidth that is consumed to generate the accumulated color buffer is reduced compared with generating a multi-sample color buffer. Reducing the amount of space needed for storing the color buffer and reducing the memory bandwidth that is consumed may improve processing performance of the PPU 500 when anti-aliased images are generated.

The PPU 500 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 500 is embodied on a single semiconductor substrate. In another embodiment, the PPU 500 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 500 may be included on a graphics card that includes one or more memory devices 504 such as GDDR5 SDRAM. The graphics card may be configured to interface with a Pete slot on a motherboard of a desktop computer that includes, e.g., a northbridge chipset and a southbridge chipset. In yet another embodiment, the PPD 500 may be an integrated graphics processing unit (iGPU) included in the chipset (i.e., Northbridge) of the motherboard.

Figure 6:
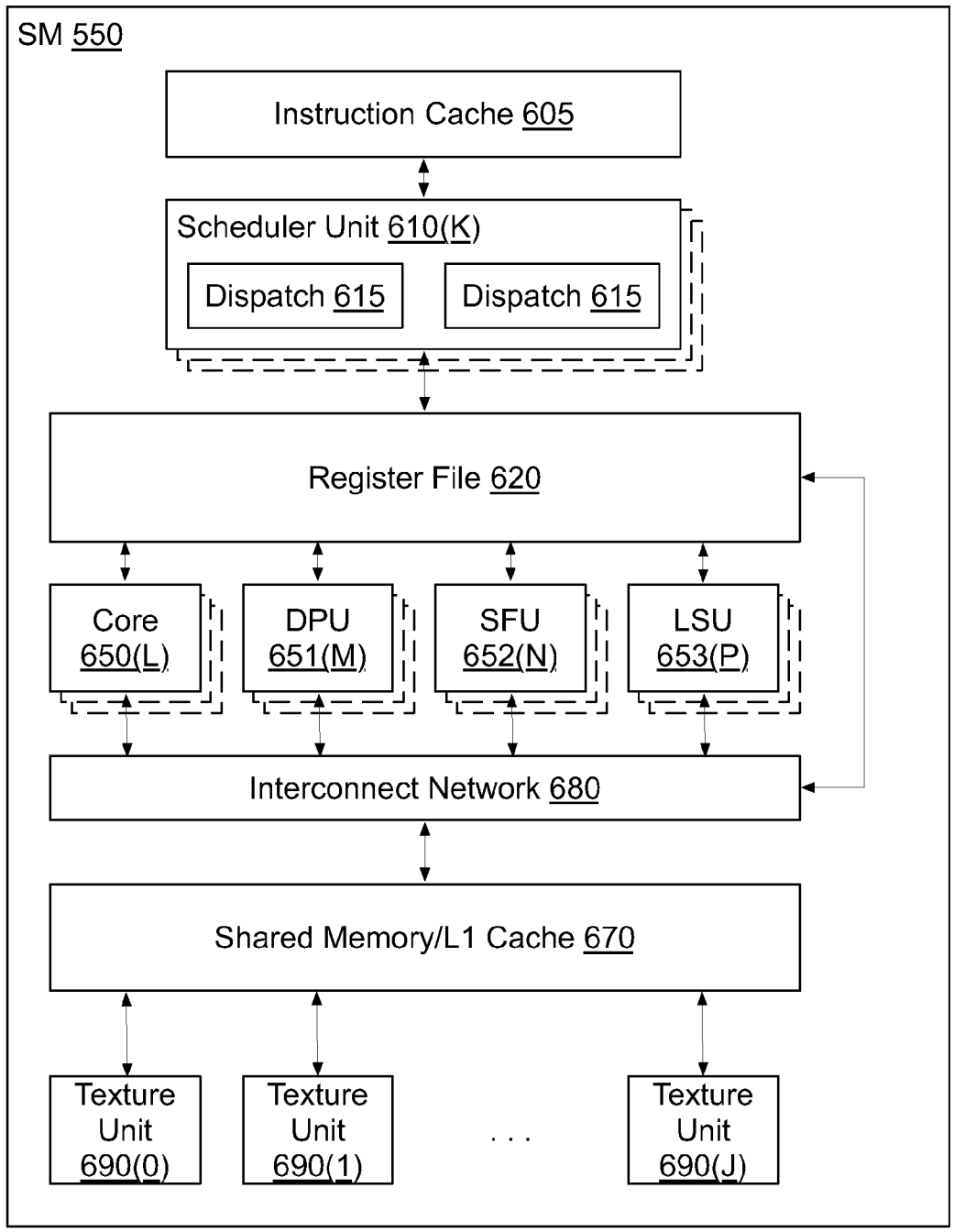
FIG. 6 illustrates the streaming multi-processor of FIG. 5, according to one embodiment.

FIG. 6 illustrates the streaming multi-processor 550 of FIG. 5, according to one embodiment. As shown in FIG. 6, the SM 550 includes an instruction cache 605, one or more scheduler units 610, a register file 620, one or more processing cores 650, one or more double precision units (DPUs) 651, one or more special function units (SFUs) 652, one or more load/store units (LSUs) 653, an interconnect network 680, a shared memory/L1 cache 670, and one or more texture units 690.

As described above, the work distribution unit 520 dispatches active grids for execution on one or more SMs 550 of the PPU 500. The scheduler unit 610 receives the grids from the work distribution unit 520 and manages instruction scheduling for one or more thread blocks of each active grid. The scheduler unit 610 schedules threads for execution in groups of parallel threads, where each group is called a warp. In one embodiment, each warp includes 32 threads. The scheduler unit 610 may manage a plurality of different thread blocks, allocating the thread blocks to warps for execution and then scheduling instructions from the plurality of different warps on the various functional units (i.e., cores 650, DPUs 651, SFUs 652, and Us 653) during each clock cycle.

In one embodiment, each scheduler unit 610 includes one or more instruction dispatch units 615. Each dispatch unit 615 is configured to transmit instructions to one or more of the functional units. In the embodiment shown in FIG. 6, the scheduler unit 610 includes two dispatch units 615 that enable two different instructions from the same warp to be dispatched during each clock cycle. In alternative embodiments, each scheduler unit 610 may include a single dispatch unit 615 or additional dispatch units 615.

Each SM 650 includes a register file 620 that provides a set of registers for the functional units of the SM 650. In one embodiment, the register file 620 is divided between each of the functional units such that each functional unit is allocated a dedicated portion of the register file 620. In another embodiment, the register file 620 is divided between the different warps being executed by the SM 550. The register file 620 provides temporary storage for operands connected to the data paths of the functional units.

Each SM 550 comprises L processing cores 650. In one embodiment, the SM 550 includes a large number (e.g., 192, etc.) of distinct processing cores 650. Each core 650 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 550 also comprises M DPUs 651 that implement double-precision floating point arithmetic, N SFUs 652 that perform special functions (e.g., copy rectangle, pixel blending operations, and the like), and P LSUs 653 that implement load and store operations between the shared memory/L1 cache 670 and the register file 620. In one embodiment, the SM 550 includes 64 DPUs 651, 32 SFUs 652, and 32 LSUs 653.

Each SM 550 includes an interconnect network 680 that connects each of the functional units to the register file 620 and the shared memory/L1 cache 670. In one embodiment, the interconnect network 680 is a crossbar that can be configured to connect any of the functional units to any of the registers in the register file 620 or the memory locations in shared memory/L1 cache 670.

In one embodiment, the SM 550 is implemented within a GPU. In such an embodiment, the SM 550 comprises J texture units 690. The texture units 690 are configured to load texture maps (i.e., a 2D array of texels) from the memory 504 and sample the texture maps to produce sampled texture values for use in shader programs. The texture units 690 implement texture operations such as anti-aliasing operations using mip-maps (i.e., texture maps of varying levels of detail). In one embodiment, the SM 550 includes 16 texture units 690.

The PPU 500 described above may be configured to perform highly parallel computations much faster than conventional CPUs. Parallel computing has advantages in graphics processing, data compression, biometrics, stream processing algorithms, and the like.

Figure 7:
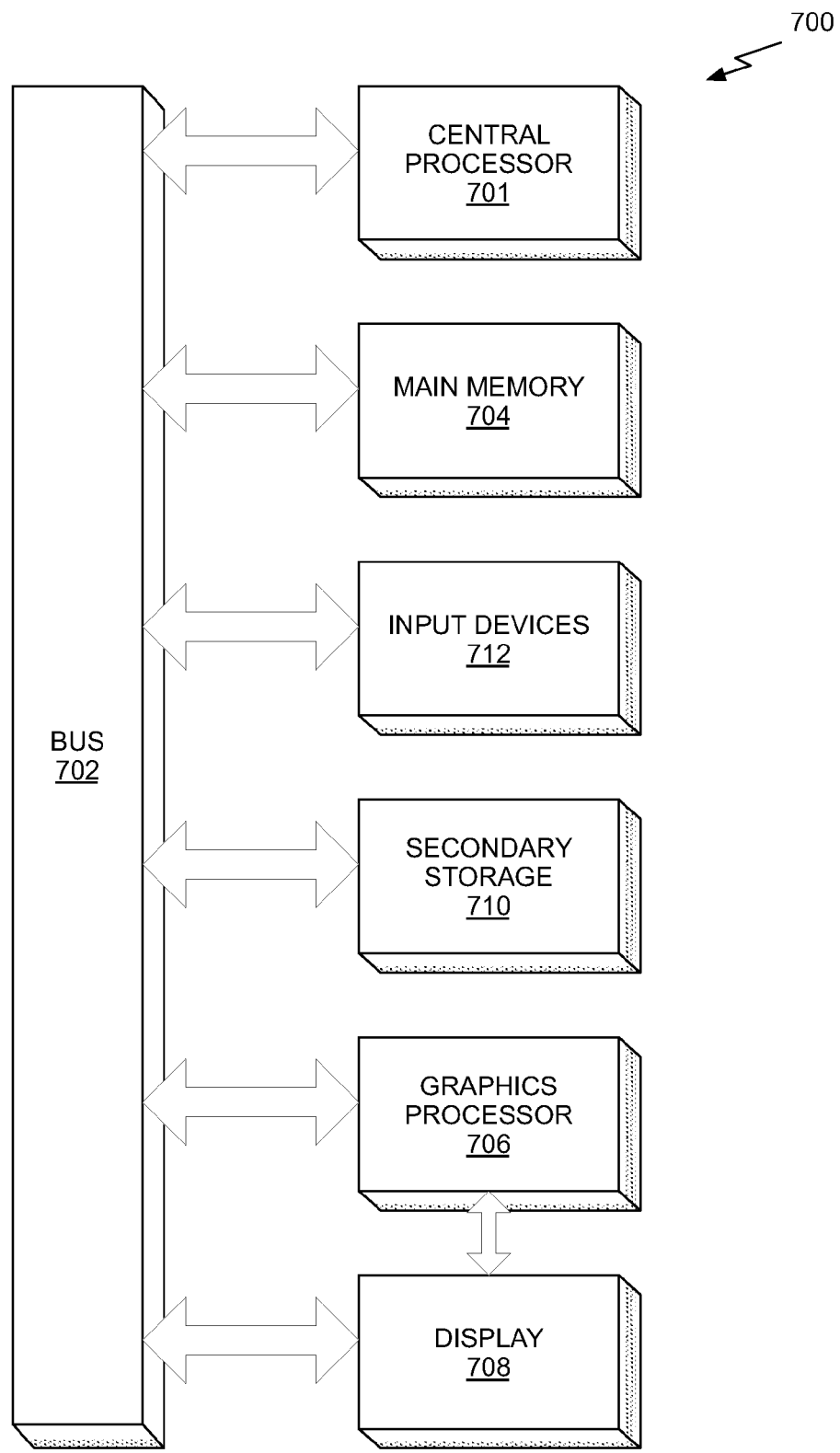
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. For example, a compiler program that is configured to examiner a shader program and enable or disable attribute buffer combining may be stored in the main memory 704. The compiler program may be executed by the central processor 701 or the graphics processor 706. The main memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit hoard system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of anti-aliasing, comprising:
   computing, by a graphics processing unit during a first processing pass of a plurality of graphics primitives, z data for multiple samples of each pixel in an image to generate a multi-sample z buffer;
   setting a stencil function to pass for only one of two or more graphics primitives that cover a sample location when tested against a stencil value stored in a multi-sample stencil buffer for the sample location;
   during a second processing pass of the graphics primitives:
   determining, by the graphics processing unit, if a sample location covered by a graphics primitive passes a z test and the stencil function,
   then updating, by the graphics processing unit, the stencil value to a first value when the sample location corresponds to an initial stencil value indicating that a graphics primitive that covers the sample location has not been processed during the second processing pass, or
   else discarding, by the graphics processing unit, the sample location for the graphics primitive when the sample location corresponds to the first value indicating that a graphics primitive that covers the sample location has been processed during the second processing pass; and
   accumulating, by the graphics processing unit, computed color values corresponding to each pixel into a color buffer that stores one color value for each pixel, wherein the computed color values are not stored in a multi-sample color buffer.

2. The method of claim 1, further comprising scaling each sample color value based on a number of samples per pixel to generate modulated sample color values during the second processing pass.

3. The method of claim 2, further comprising combining the modulated sample color values for each pixel during the second processing pass.

4. The method of claim 3, wherein the combining comprises summing the modulated color values for each sample of a pixel that is covered by a particular graphics primitive.

5. The method of claim 1, further comprising scaling a sample color value based on coverage and a number of samples per pixel to generate a combined modulated sample color value for a pixel during the second processing pass.

6. The method of claim 1, wherein the multi-sample stencil buffer is used during the second processing pass to compute only one color value for each sample that is covered by at least one of the graphics primitives.

7. The method of claim 1, further comprising, prior to the second processing pass of the graphics primitives,
   clearing the multi-sample stencil buffer to the initial stencil value.

8. The method of claim 1, further comprising, prior to the second processing pass of the graphics primitives:
   clearing the color buffer to an initial value; and
   setting a color blend function to add color values.

9. The method of claim 1, further comprising prior to the first processing pass of the graphics primitives:
   clearing the multi-sample z buffer to an initial value; and
   setting a z test function to "less than".

10. The method of claim 1, further comprising prior to the first processing pass of the graphics primitives:
    clearing the multi-sample z buffer to an initial value; and
    setting a z test function to "less than or equal".

11. The method of claim 1, further comprising, prior to the second processing pass of the graphics primitives, setting a z test function to "equal".

12. A non-transitory computer-readable storage medium storing instructions that, when executed by a processor, cause the processor to perform anti-aliasing comprising:
    computing z data for multiple samples of each pixel in an image to generate a multi-sample z buffer during a first processing pass of a plurality of graphics primitives;
    setting a stencil function to pass for only one of two or more graphics primitives that cover a sample location when tested against a stencil value stored in a multi-sample stencil buffer for the sample location;
    during a second processing pass of the graphics primitives:
    determining if a sample location covered by a graphics primitive passes a z test and the stencil function,
    then updating the stencil value to a first value when the sample location corresponds to an initial stencil value indicating that a graphics primitive that covers the sample location has not been processed during the second processing pass, or
    else discarding the sample location for the graphics primitive when the sample location corresponds to the first value indicating that a graphics primitive that covers the sample location has been processed during the second processing pass; and
    accumulating computed color values corresponding to each pixel into a color buffer that stores one color value for each pixel, wherein the computed color values are not stored in a multi-sample color buffer.

13. The non-transitory computer-readable storage medium of claim 12, further comprising, scaling each sample color value based on a number of samples per pixel to generate modulated sample color values during the second processing pass.

14. The non-transitory computer-readable storage medium of claim 13, further comprising, combining the modulated sample color values for each pixel during the second processing pass.

15. The non-transitory computer-readable storage medium of claim 12, further comprising, prior to the second processing pass of the graphics primitives:
    clearing the color buffer to an initial value; and
    setting a color blend function to add color values.

16. A system comprising:
    a memory storing a multi-sample z buffer and a color buffer that stores one color value for each pixel; and one or more processing units coupled to the memory and configured to:
  compute z data for multiple samples of each pixel in an image and store the z data in the multi-sample z buffer during a first processing pass of a plurality of graphics primitives;
  set a stencil function to pass for only one of two or more graphics primitives that cover a sample location when tested against a stencil value stored in a multi-sample stencil buffer for the sample location;
during a second processing pass of the graphics primitives:
  determine if a sample location covered by a graphics primitive passes a z test and the stencil function,
    then update the stencil value to a first value when the sample location corresponds to the initial stencil value indicating that a graphics primitive that covers the sample location has not been processed during the second processing pass, or
    else discard the sample location for the graphics primitive when the sample location corresponds to the first value indicating that a graphics primitive that covers the sample location has been processed during the second processing pass; and
  accumulate the computed color values corresponding to each pixel into the color buffer, wherein the computed color values are not stored in a multi-sample color buffer.

17. The system of claim 16, wherein the one or more processing units reside within a graphics processing unit.

18. The system of claim 16, wherein the one or more processing units are further configured to scale a sample color value based on coverage and a number of samples per pixel to generate a combined modulated sample color value for a pixel during the second processing pass.

19. The method of claim 1, further comprising during the second processing pass of the graphics primitives, computing the z data for multiple samples of each pixel in the image.

20. The system of claim 16, wherein the one or more processing units are further configured to, during the second processing pass of the graphics primitives, compute the z data for multiple samples of each pixel in the image.

* * * * *